Oct. 30, 1934.  O. R. NICHOLS  1,979,047
DRAWING INSTRUMENT
Filed May 16, 1933
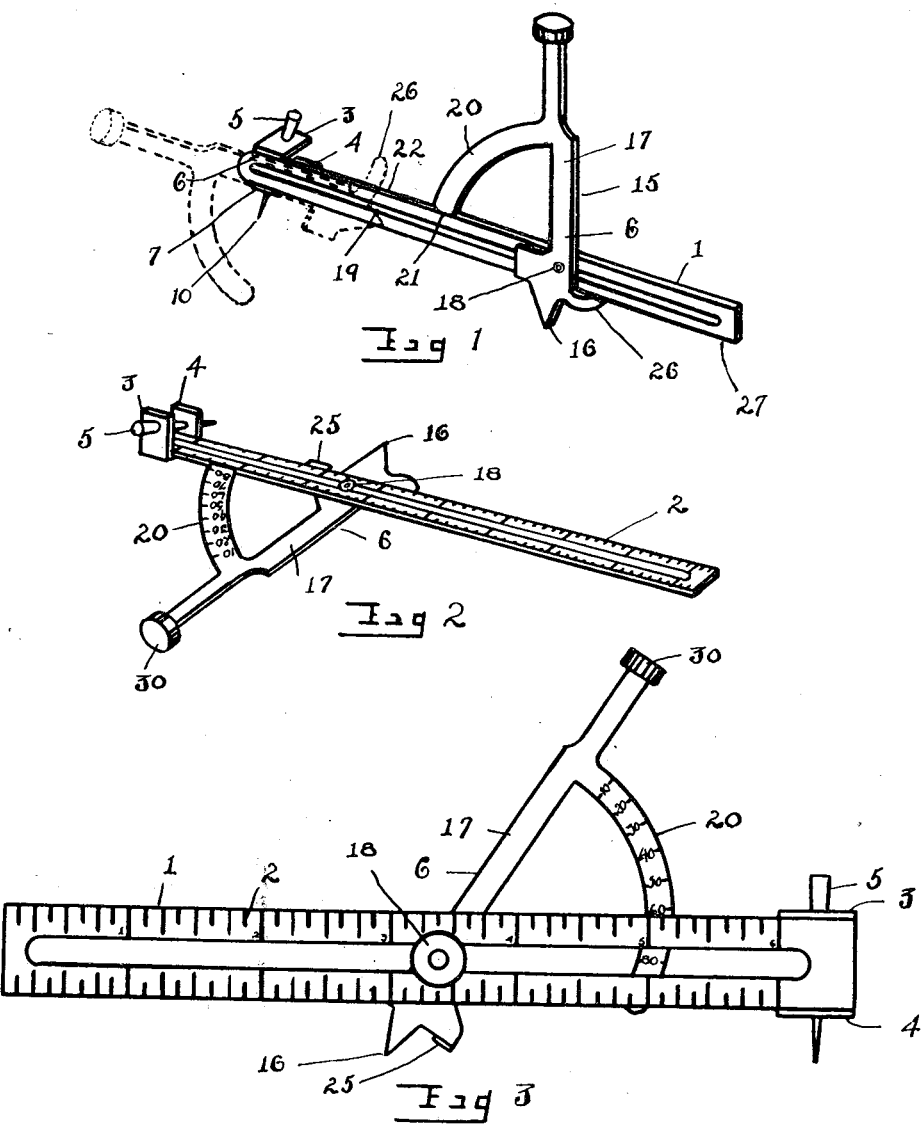
Inventor
Orlo R. Nichols
By Thomas L. Wilder
Attorney Patented Oct. 30, 1934

1,979,047

UNITED STATES PATENT OFFICE 1,979,047

DRAWING INSTRUMENT

Orlo R. Nichols, Leonardsville, N. Y.

Application May 16, 1933, Serial No. 671,343

4 Claims. (Cl. 33—102)

My invention relates to a drawing instrument and I declare the following to be a full, clear, concise and exact description thereof sufficient to enable anyone skilled in the art to which it appertains to make and use the same, reference being had to the accompanying drawing in which like reference characters refer to like parts throughout the specification.

The object of the invention is to provide a drawing instrument that can be folded into a compact bundle for carrying in a person's pocket, whereby to be available at all times.

Furthermore, the instrument combines the features of a compass, protractor and rule.

The object will be understood by referring to the drawing in which:

Fig. 1 is a perspective view of the device.

Fig. 2 is a perspective view taken at a different angle from Fig. 1.

Fig. 3 is an enlarged plan view showing the protractor in use.

Referring more particularly to the drawing, the device embodies a rule 1 which has a graduated scale 2 marked thereon.

There are affixed to one end of rule 1 laterally extending clips or plates 3 and 4 for holding pencil 5. The edges 6 and 7 of clips 3 and 4 respectively are flushed with one of the lateral surfaces of rule 1, whereby to allow for laying rule 1 upon its lateral surface in a horizontal position when using it as a rule or measure stick. Clip 4 is shorter than clip 3 because of the angle at which pencil 5 is held. Pencil 5 is projected through beveled apertures formed in clips 3 and 4 which hold it at an angle, as above stated, whereby its point 10 will be in alignment with the point of the compass hereinafter described. Pencil 5 is made removable from its apertures in clips 3 and 4.

The compass 15 embodies a sliding member 6 having a point 16 upon which to allow pencil 5 to describe a circle or any part thereof.

Compass 15 has a sliding fit with rule 1. To this end it is provided with an upstanding portion 17 through which projects a hollow rivet 18. Said rivet 18 extends also through an elongated aperture 19 made in rule 1 and allows member 15 to slide relative to rule 1 within the limits of said aperture 19.

In order to hold member 15 in upright position relative to rule 1 as shown in full lines in Fig. 1, there is employed an arc shaped member or protractor 20. The lower end 21 of protractor 20 rests upon the upper edge 22 of rule 1. To this end protractor 20 is bent inward slightly, the amount of its thickness. The protractor is made of a resilient metal to allow for pushing end 21 of protractor 20 free from the upper edge 22 of rule 1, when folding the compass as shown more particularly in dotted lines in Fig. 1.

To also aid in holding member 15 in upright position, a ledge 25 is formed on the lower part of member 15 at one side and a forwardly projecting member 26 on the other. Ledge 25 engages the under edge 27 of rule 1 and so likewise does the forwardly projecting part 26. Part 26, however, is bent for thus engaging lower edge 27. It is also made of resilient material whereby to allow for pushing said part 26 free from edge 27 when folding the compass.

The upper part of member 15 has a knurled head 30 which is useful in turning member 15 upon pivot 18 relative to rule 1 when folding and unfolding said compass or when using protractor 20.

Protractor 20 has a graduated scale thereon indicating angles between 0 and 90°. The figures are written in a horizontal position on said protractor 20 and on that surface of member 20, whereby they can be read when looking down through elongated opening 19 in rule 1, whereby to indicate the angle desired. Furthermore, hollow pivot 18 will permit looking therethrough to locate a point beneath the rule 1 when using said rule as a protractor.

The object of the device when using the device as a compass may be effected by swinging protractor 15 on its pivot 18 into full line position as shown in Fig. 1. In this position protractor 15 can be slid along rule 1 to any predetermined radius for describing a given circle. With the parts in this position, point 16 will penetrate the paper and pencil 5 can then be moved by moving rule 1 upon point 16 as a center.

If it is desired to use the instrument as a protractor, rule 1 will be laid down upon its side as shown in Fig. 2 and member 15 turned upon pivot 18 until the proper reading is observed through elongated opening 19 of rule 1. The center will be located in this instance by observing the point through the hollow rivet 18.

Moreover rule 1 may be used simply as a rule, the scale 2 serving for that purpose.

In order to fold compass 15 into dotted line position shown in Fig. 1, the lower end 21 of arc shaped member 20 is pushed free of the lower edge 27 of rule 1. The device 15 is then pushed towards end 31 of rule 1 and turned on rivet 18 to bring corresponding parts in parallel relation or folded position.

In using the device as a protractor, it will be understood that member 15 can be used to determine the base line of the angle desired and rule 1 moved on pivot 18 to the proper angle to thereby determine the opposite side.

It is also to be understood that the end 21 of protractor 20 may be made to fit flush with the upper edge 22 of rule 1 and not to project over thereon when using the device as a compass. In this instance, ledge 25 and forwardly projecting member 26 will be sufficient to hold member 15 in upright position.

Having thus described my invention what I claim as new and desire to secure by Letters Patent is as follows:

1. In a drawing instrument, a member having a graduated scale marked thereon, another member pivoted to said first named member and having an arc shaped member formed thereon, mounted to turn relative to said first named member, a resilient member formed on said second named member for holding it in given relation to first named member, whereby said first named member can be used as a compass and a slot formed in said first named member, whereby to allow the pivot of said second named member to slide relative thereto.

2. In a drawing instrument, a member having a graduated scale marked thereon, a slot formed in said member, a second member having an arc shaped member formed thereon, a pivot mounted in said second member projecting through said slot of the first named member, whereby to allow said second named member to slide relative to said first named member, a ledge and resilient projecting member formed on said second named member to hold it in predetermined position with respect to said first named member and a marker held by said first named member, whereby to aid in forming a compass.

3. In a drawing instrument, a measuring stick, a pencil removably mounted on said measuring stick, a member slidingly mounted to said measuring stick, said member having a point, whereby to convert said measuring stick into a compass, an arc shaped member formed on said sliding member and co-operating with said measuring stick to determine an angle and a ledge and resilient projecting member carried by said sliding member for holding said sliding member in given relation to said measuring stick.

4. In a drawing instrument, a measuring stick, clips attached to said measuring stick, said clips having apertures for the insertion of a pencil, a member pivotally mounted to said measuring stick, a pivot mounted in said sliding member, a slot formed in said measuring stick for allowing said member to slide upon said measuring stick, said member having a point, whereby to convert said measuring stick into a compass and an arc shaped member formed on said sliding member and co-operating with said measuring stick to determine an angle.

ORLO R. NICHOLS.